Patented May 26, 1942

2,284,124

UNITED STATES PATENT OFFICE 2,284,124

PURIFICATION OF HIGH-MELTING ORGANIC COMPOUNDS

Edgar C. Britton, Frank B. Smith, and Robert L. Brown, Midland, Mich., assignors to The Dow Chemical Company, Midland, Mich., a corporation of Michigan No Drawing. Application December 1, 1939, Serial No. 307,154

4 Claims. (Cl. 202—56)

This invention relates to an improved method for removing certain impurities from high-melting organic compounds.

Many organic chemical compounds which are prepared by synthesis or by isolation from a natural product, such as coal tar, are initially obtained in rather impure form, being contaminated with varying amounts of colored impurities. Usually such compounds may be purified and decolorized by distillation under normal or reduced pressure, but in a number of cases the impurities exhibit a strong tendency to distill along with the product, so that only a partial purification is attained even by repeated distillations. The problem becomes even more difficult when the compound to be purified is a high-melting solid, i. e. having a melting point above about 175° C., since such compounds almost invariably decompose when distilled at atmospheric pressure, and tend to sublime, with consequent plugging of vacuum lines, condenser, etc., when distilled under vacuum.

We have now found that such high-melting organic compounds may readily be freed of colored impurities which tend to distill therewith by mixing the compound with an organic liquid in which the compound is soluble when hot but relatively insoluble when cold, and thereafter subjecting the mixture to distillation under reduced pressure. The distillate consists of a mixture of the auxiliary liquid and the purified compound, from which mixture the latter is readily separated simply by cooling and filtering. We have also found that maximum distillation efficiency, i. e. a maximum ratio of purified compound to liquid in the distillate, is attained when the liquid has a boiling point approximating that of the compound at the particular pressure employed. Among the various types of organic liquids which we have found suitable for use in our new process may be mentioned aryl phosphates, such as tri-cresyl phosphate, mono-o-chlorophenyl di-phenyl phosphate, etc., high-boiling esters, such as dibutyl phthalate, butyl phthalyl butyl glycolate, etc., and high-boiling ethers, such as B.B'-di-phenoxy-diethyl ether, the diethyl ether of ethylene glycol, cyclohexylated diphenyl ether, and their halogenated derivatives. The latter compounds, particularly the lower halogenated di-phenyl ethers, such as di-chloro-diphenyl ether, are particularly suitable because of their excellent stability towards heat.

The new process may be carried out batchwise or continuously, the latter mode of procedure being preferred because of its economy and ease of operation. Such method consists simply in distilling the mixture of auxiliary liquid and crude compound as hereinbefore described, continuously filtering the purified compound from the distillate, and returning the liquid to the distilling apparatus while replenishing the initial mixture with fresh quantities of the crude compound. The impurities which accumulate in the still are drawn off and discarded from time to time. Ordinarily, substantially complete purification and decolorization is secured by a single distillation treatment as herein described, but if the crude product is exceptionally difficult to purify or if an especially refined product is desired, it may occasionally be necessary to subject the product to a second distillation treatment.

While the principle of the invention is applicable to the purification and decolorization of any high-melting organic compound, we have found the new method to be particularly effective in purifying and decolorizing crude phenthiazine, which, as a result of the manner in which it is prepared, contains large quantities of colored impurities which are exceedingly difficult to remove on a commercial scale by distillation, crystallization, or sublimation.

The following examples illustrate several ways in which the principle of the invention has been applied, but are not to be construed as limiting the same.

Example 1

A mixture of 100 grams of mixed isomeric mono-cyclohexyl-diphenyl ethers (B. P.=185°–260° C. under 20 millimeters pressure) and 50 grams of crude, black phenthiazine (obtained directly by reaction between diphenylamine and sulphur) was distilled from a Claisen flask under a pressure of about 18–20 millimeters of mercury. An initial, low boiling fraction was discarded. The second fraction, weighing 109 grams and distilling at 185°–218° C., was cooled in ice, and the purified phenthiazine which separated out of solution was removed by centrifuging and was washed with carbon tetrachloride and ethanol. There was obtained 31 grams of light-yellow crystalline phenthiazine having a melting point of about 182°–185° C. The distillation residue remaining in the distillation flask was a shiny black tar, in amount of 29 grams.

Example 2

In a Claisen flask fitted with a dropping funnel and an 8 inch Vigreux column connected to a condenser and receiver, 988 grams of crude black phenthiazine was heated under 20 millimeters pressure while di-chloro-diphenyl ether was slowly introduced into the flask through the dropping funnel. After removing a small fore-run (93 grams, distilling up to 210° C.), the distillation temperature was raised to about 230° C. and maintained at about 225°–235° C. by regulating the rate of addition of the di-chloro-diphenyl ether. After 381 grams of di-chloro-diphenyl ether had been added, 911 grams of distillate was removed from the receiver, and was cooled and centrifuged. There was obtained 554 grams of light-yellow phenthiazine, melting at 184°–186° C. The di-chloro-diphenyl ether recovered from the centrifuging operation was used to continue the distillation. The second distillate, weighing 595 grams, yielded 214 grams of light-yellow phenthiazine melting at 181°–184° C. The total yield of phenthiazine was about 78 per cent. The residue in the distilling flask was a very brittle, shiny, black tar, weighing 120 grams.

*Example 3*

The following table illustrates the use of several different organic liquids in purifying and decolorizing various high-melting organic compounds by distillation according to the invention. In each case, the compound was mixed with the liquid and distilled under vacuum in a manner similar to that described in Example 1.

Table

| Compound | Color | Auxiliary liquid | Boiling range of mixture | Product | | |
|---|---|---|---|---|---|---|
| | | | | Yield | Melting point | Color |
| | | | ° C./mm. | Percent | ° C. | |
| Phenthiazine | Black | Mono-o-chlorophenyl di-phenyl phosphate | 235–278/20 | 62 | 185–185.5 | Light yellow. |
| Do | do | Tricresyl phosphate | 230–279/20 | 60 | 185–185.5 | Do. |
| Do | do | B.B'-di-toloxy-diethyl ether | 220–245/20 | 67 | 185–185.5 | Do. |
| Do | do | Dibutyl phthalate | 205–237/20 | 56 | 184–185 | Do. |
| Do | do | Phenyl-diphenyl ether | 170–240/20 | 82 | 180 | Light orange. |
| Do | do | Di-chloro-diphenyl ether | 180–220/40 | 42 | 215–216 | White. |
| p-Hydroxy-benzoic acid | Brown | do | 180–195/20 | 60 | 188–189 | Do. |
| Pentachlorophenol | do | do | 176–220/20 | 77 | 175–176.5 | Light yellow. |
| Zanthon | Dark yellow | do | 205–230/40 | 79 | 215–216 | Do. |
| Anthracene | Yellow | do | | | | |
| Hexachlorobenzene | Orange | do | 205–230/50 | 92 | 228–229 | White. |

Other modes of applying the principle of our invention may be employed, change being made as regards the method herein disclosed, provided the steps stated by any of the following claims or the equivalent of such stated steps be employed.

We therefore particularly point out and distinctly claim as our invention:

1. In a method of freeing phenthiazine from colored impurities which tend to distill therewith, the steps which comprise adding a liquid consisting essentially of chlorinated diphenyl ether, distilling the liquid mixture, and thereafter separating purified phenthiazine from the distillate.

2. In a method of freeing phenthiazine from colored impurities which tend to distill therewith, the steps which comprise adding a liquid consisting essentially of chlorinated diphenyl ether; distilling the liquid mixture, thereafter separating purified phenthiazine from the distillate, returning the residual chlorinated diphenyl ether to the mixture undergoing distillation, and replenishing said mixture with additional quantities of the crude phenthiazine.

3. In a method of freeing phenthiazine from colored impurities which tend to distill therewith, the steps which comprise adding a liquid organic compound which, at the distillation pressure employed, has a boiling point approximating that of phenthiazine and which is selected from the group consisting of aryl phosphates, esters, ethers, and halogenated derivatives of said compounds; distilling the liquid mixture; and thereafter separating purified phenthiazine from the distillate.

4. In a method of freeing phenthiazine from colored impurities which tend to distill therewith, the steps which comprise adding a liquid organic compound which, at the distillation pressure employed, has a boiling point approximately that of phenthiazine and which is selected from the group consisting of aryl phosphates, esters, ethers, and halogenated derivatives of said compounds; distilling the liquid mixture; thereafter separating purified phenthiazine from the distillate; returning the residual liquid to the mixture undergoing distillation; and replenishing said mixture with additional quantities of the crude phenthiazine.

EDGAR C. BRITTON.
FRANK B. SMITH.
ROBERT L. BROWN.